(12) United States Patent
Dilts et al.

(10) Patent No.: US 10,462,973 B2
(45) Date of Patent: Nov. 5, 2019

(54) GRAIN ELEVATOR PADDLE FOR COMBINE HARVESTER

(71) Applicant: CNH Industrial America LLC, New Holland, PA (US)

(72) Inventors: Mark Dilts, New Holland, PA (US); Denver Romayne Yoder, Manheim, PA (US); Reuben Dise, East Earl, PA (US)

(73) Assignee: CNH Industrial America LLC, New Holland, PA (US)

( * ) Notice: Subject to any disclaimer, the term of this patent is extended or adjusted under 35 U.S.C. 154(b) by 146 days.

(21) Appl. No.: 15/622,753

(22) Filed: Jun. 14, 2017

(65) Prior Publication Data

US 2018/0359927 A1    Dec. 20, 2018

(51) Int. Cl.
*A01F 12/46* (2006.01)
*B65G 17/12* (2006.01)
*B65G 17/36* (2006.01)

(52) U.S. Cl.
CPC ............ *A01F 12/46* (2013.01); *B65G 17/126* (2013.01); *B65G 17/36* (2013.01)

(58) Field of Classification Search
CPC ......... A01F 12/46; A01D 41/12; B65G 19/22; B65G 19/06; B65G 19/08; B65G 17/36; B65G 17/126
See application file for complete search history.

(56) References Cited

U.S. PATENT DOCUMENTS

| | | | |
|---|---|---|---|
| 3,404,639 A | 10/1968 | Lindquist | |
| 3,866,742 A | 2/1975 | Freese et al. | |
| 5,337,886 A | 8/1994 | Anderson et al. | |
| 6,381,937 B1 * | 5/2002 | Nelson | A01D 46/12 56/127 |
| 7,377,378 B2 | 5/2008 | Cash, III | |
| 10,131,501 B1 * | 11/2018 | Kopf | A01F 12/46 |
| 2015/0366140 A1 | 12/2015 | Strnad et al. | |
| 2016/0143221 A1 | 5/2016 | Koch et al. | |

FOREIGN PATENT DOCUMENTS

| | | |
|---|---|---|
| EP | 1298077 A2 | 4/2003 |
| JP | 60183415 A | 9/1985 |

* cited by examiner

*Primary Examiner* — Alicia Torres
(74) *Attorney, Agent, or Firm* — Peter K. Zacharias; Patrick M. Sheldrake

(57) ABSTRACT

A paddle for a grain elevator of a combine harvester includes a plate and a leg. The plate is configured to be coupled to a chain at a first location on the chain. The plate has a top side for carrying grain, a bottom side opposite the top side, and a lip that extends along a perimeter of the top side of the plate for retaining the grain on the top side. The leg extends from a bottom side of the plate for releasably contacting the chain at a second location that is spaced from the first location.

26 Claims, 12 Drawing Sheets

GRAIN ELEVATOR PADDLE FOR COMBINE HARVESTER

FIELD OF THE INVENTION

The present invention relates to a paddle of a grain elevator for a combine harvester.

BACKGROUND OF THE INVENTION

The basic details of a grain elevator for a combine harvester are disclosed in U.S. Patent No. 2015/0366140 to Strnad, which is incorporated by reference herein in its entirety. As described in U.S. Patent No. 2015/0366140, while referring to prior art FIG. 1, when harvesting crops with an agricultural harvester combine 10, the crop being harvested is cut or collected as the combine traverses the field, by the header 12 mounted to the forward end of the combine 10. The header 12 feeds the crop into the feeder house 14 which carries the crop to the thresher, indicated generally by reference numeral 16 within the interior of the combine 10. The thresher 16 removes the grain from the plant material (e.g., the stalk, cob, pods or other plant material depending on the crop being harvested). The threshed grain then passes through sieves, indicated generally by reference numeral 18, which separate the grain from the unwanted plant debris. The unwanted plant debris is passed toward the back of the combine where it is discharged.

The sieved "clean" grain is directed toward and is collected at the bottom of the clean grain elevator 22. The clean grain elevator 22 lifts the collected clean grain upward into a discharge area 24. An auger 26 within the discharge area 24 carries the grain into a holding tank or hopper 28. As the hopper 28 begins to fill, the grain is unloaded as needed by the unloading auger 30 into a waiting grain cart, wagon, truck or other transport (not shown).

Referring to prior art FIGS. 1 and 2, the clean grain elevator 22 is disposed within a housing 32 and is comprised of a chain 34 which passes around upper and lower sprockets 36, 38. A plurality of equally spaced flights or paddles 40 are attached to the chain 34. As the chain 34 is rotated by the sprockets 36, 38 the paddles 40 scoop the grain being collected at the bottom of the elevator 32 and lift it upward toward the top of the elevator housing 32. As the paddles 40 pass over the upper sprocket 36, the grain is thrown into the discharge area 24 as illustrated in FIG. 2.

The paddle design suffers from at least two drawbacks. First, the paddles 40 tends to rotate (tip or tilt) rearward under the weight of the grain. In other words, the material load on an elevator paddle 40 is multiplied by the length of the paddle 40, which creates a moment that tends to tip the paddle 40 rearward, causing material to roll off of the paddle, thereby reducing conveyor efficiency. Low chain tension and round seeds exacerbates this problem. The resistance to the moment comes from the chain links to which the paddles 40 are attached. For the paddles 40 of FIGS. 1 and 2, the resisting moment may be equal to the moment arm (one link) multiplied by the chain tension.

Second, the rivets connecting the paddle 40 to the chain 34 are subject to fatigue due to the weight of the grain.

In view of the foregoing, there exists a need for an improved paddle having a reduced tendency to tip rearward and suffer from fatigue.

SUMMARY OF THE INVENTION

This disclosure is concerned with a concept to increase the efficiency of the clean grain elevator.

In one embodiment, a paddle for a grain elevator of a combine harvester includes a plate and a leg. The plate is configured to be coupled to a chain at a first location on the chain. The plate has a top side for carrying grain and a bottom side opposite the top side. The leg extends from a bottom side of the plate for releasably contacting the chain at a second location that is spaced from the first location.

In another embodiment, a paddle for a grain elevator of a combine harvester includes a plate and a leg. The plate is configured to be coupled to a chain at a first location on the chain. The plate has a top side for carrying grain, a bottom side opposite the top side, and a lip that extends along a perimeter of the top side of the plate for retaining the grain on the top side. The leg extends from a bottom side of the plate for releasably contacting the chain at a second location that is spaced from the first location.

BRIEF DESCRIPTION OF THE DRAWINGS

For the purpose of illustration, there are shown in the drawings certain embodiments of the present invention. It should be understood, however, that the invention is not limited to the precise components, arrangements, dimensions, and instruments shown. Like numerals indicate like elements throughout the drawings. In the drawings.

DETAILED DESCRIPTION OF THE INVENTION

In general, aspects of the present invention relate to a work vehicle, particularly agricultural work vehicles such as a harvester combine. It should be appreciated, however, that the invention is not limited to a combine, or any other particular type of work vehicle. Aspects of the invention are described herein with reference to a combine for illustrative purposes only.

Figure 3:
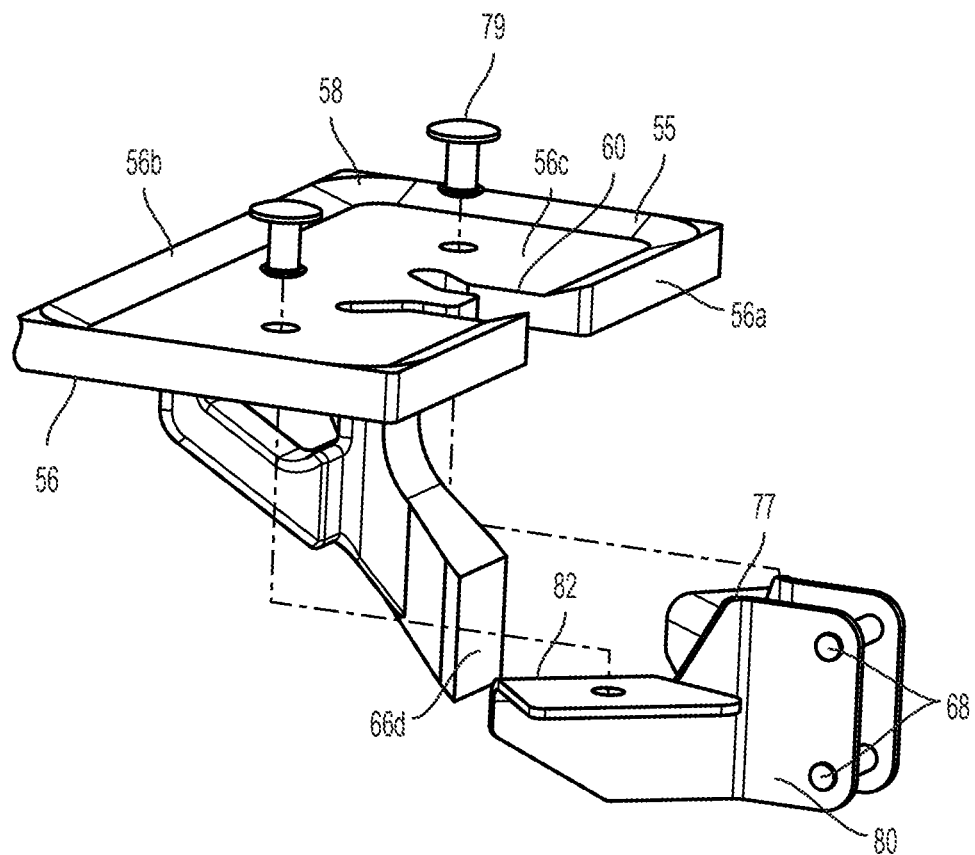
FIGS. 3 and 4 are top and bottom isometric views, respectively, of a paddle assembly, shown exploded, according to the instant invention.
Figure 4:
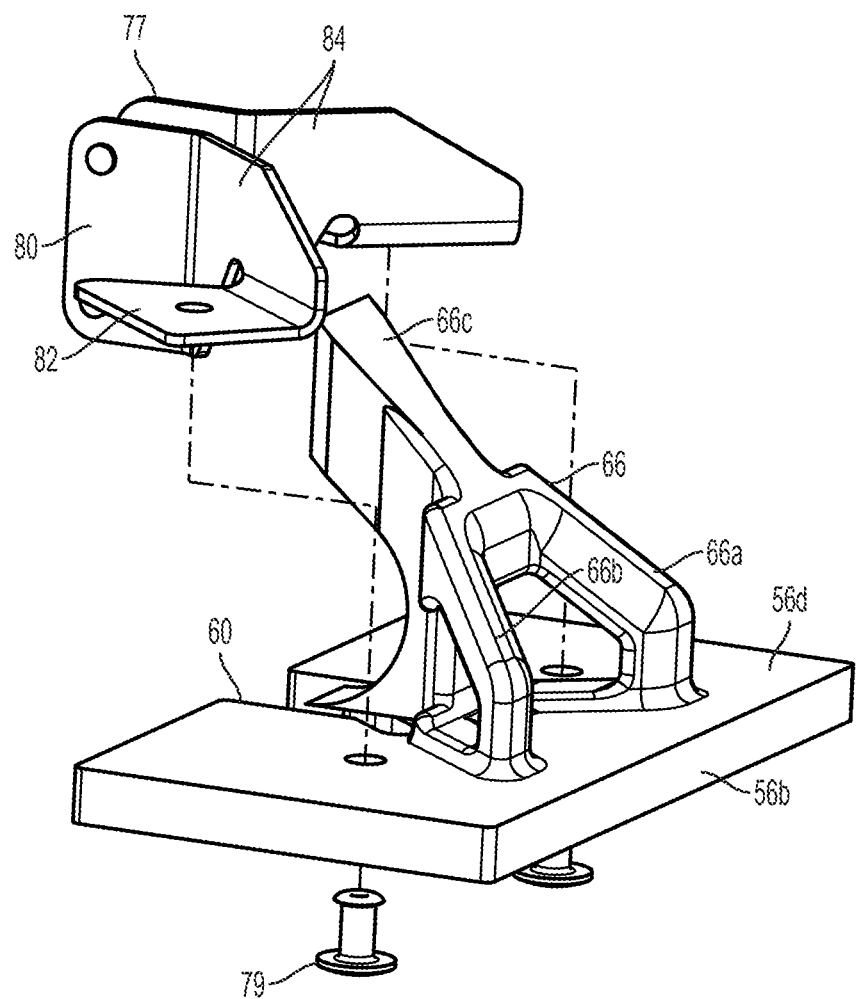
Figure 5:
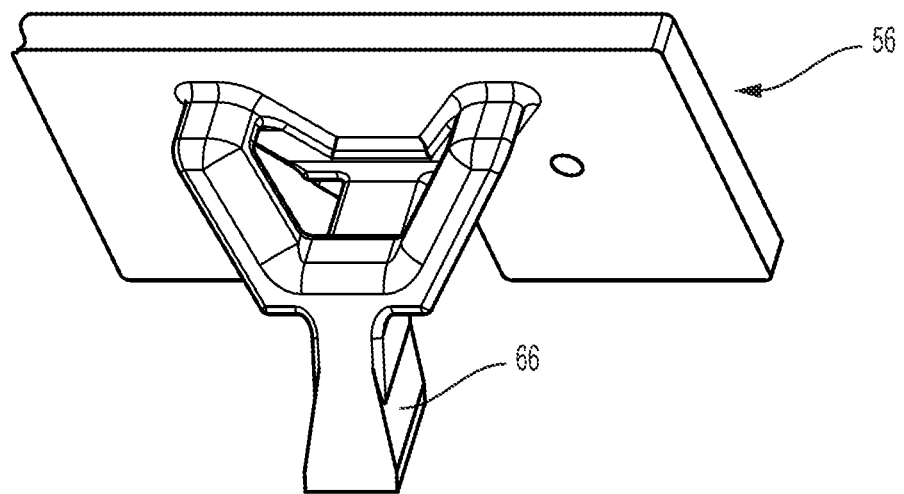
FIGS. 5-9 are isometric, side elevation, front elevation, top plan and rear elevation views, respectively, of a plate and leg of the paddle assembly of FIGS. 3 and 4.
Figure 6:
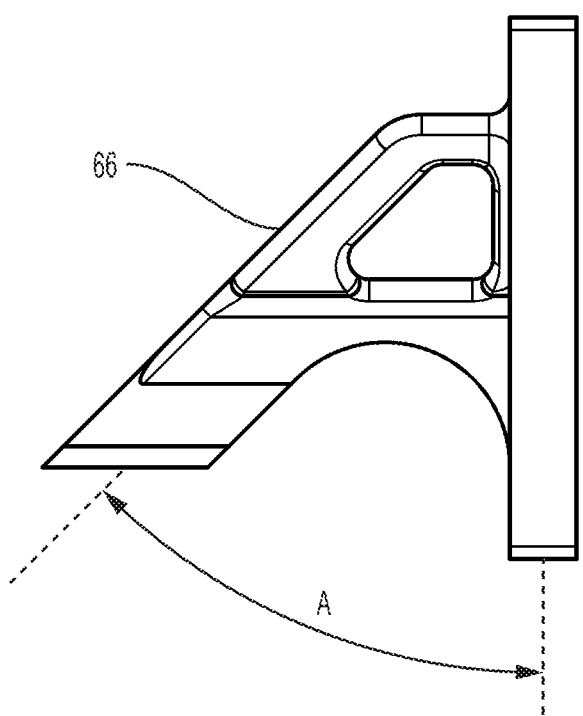
Figure 7:
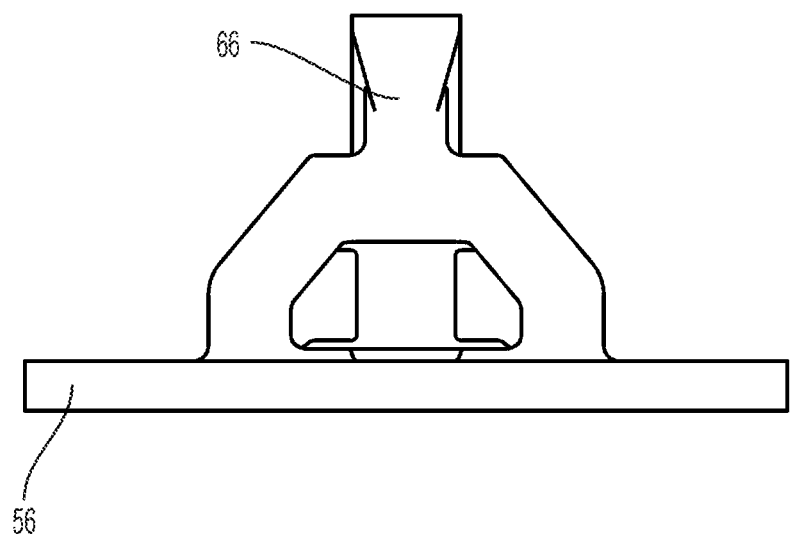
Figure 8:
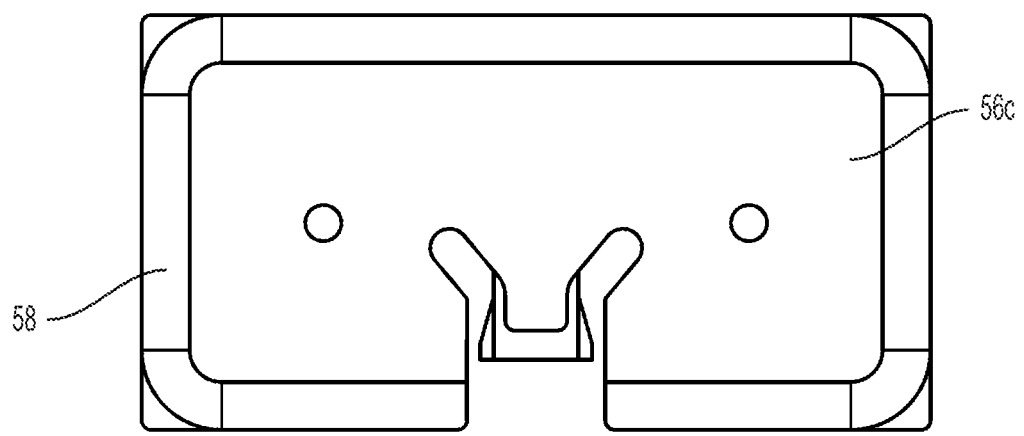
Figure 9:
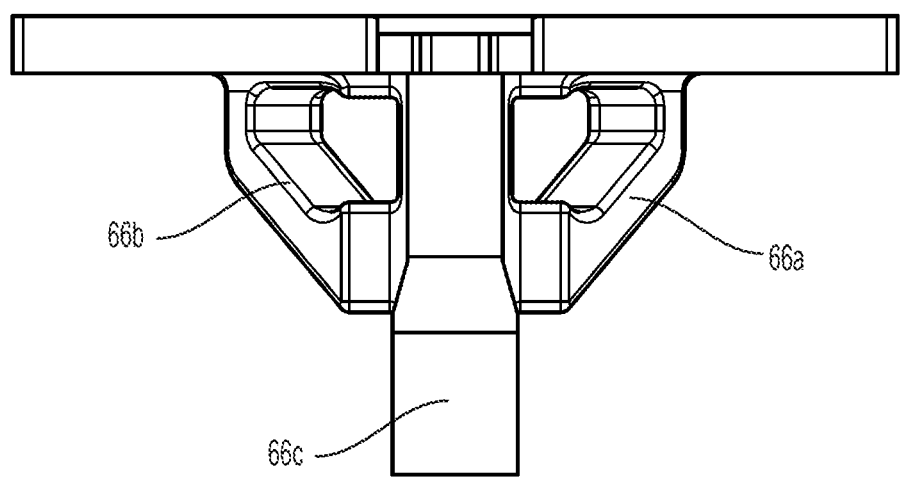

Referring now to the drawings of the instant invention, wherein like numbers refer to generally like items or features, FIGS. 3 and 4 are isometric views of a paddle assembly 55, shown exploded, and FIGS. 5-9 depict detailed views of the plate 56 and the leg 66 of the paddle assembly 55.

Figure 1:
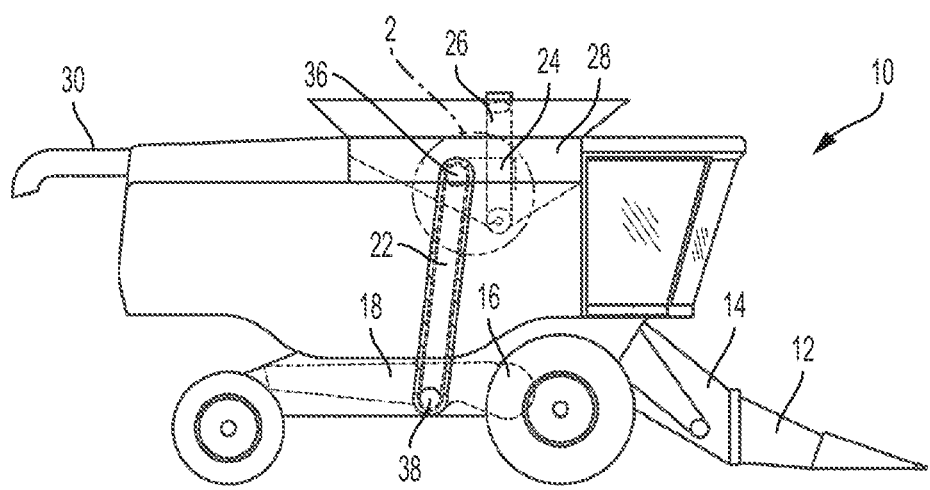
FIG. 1 is a side elevation view of a conventional combine.
Figure 2:
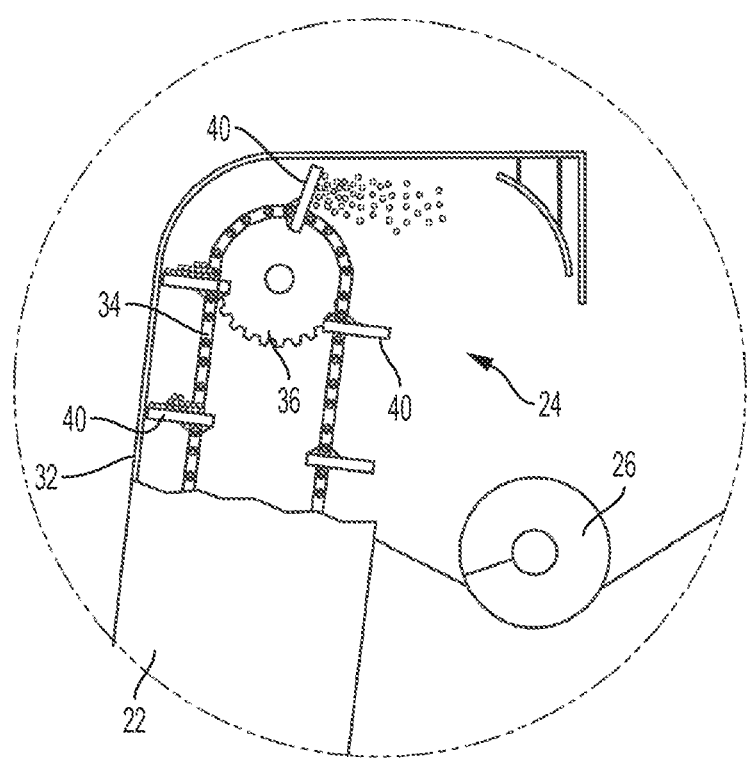
FIG. 2 is an enlarged view of the circled portion of FIG. 1.

The paddle assembly 55 is configured for use with the clean grain elevator 22 described with reference to FIGS. 1 and 2 as a replacement for the paddle 40. The differences between paddle 40 and paddle assembly 55 will be described hereinafter.

Each paddle assembly 55 generally comprises a rectangular shaped plate 56, a flange 77 for mounting the plate 56 to the chain 34, and a leg 66 extending from the bottom side of the plate 56 toward the chain 34.

The plate 56 has six sides including a rear side 56a adjacent the chain 34, a front side 56b positioned away from the chain 34, right and left sides, a flat top side 56c for carrying the grain (or other) material, and a flat bottom side 56d. Alternatively, the top side 56c may include a depression such that the plate 56 is cupped. A lip 58 extends to an elevation above the flat top side 56c and also extends about the entire perimeter of the flat top side 56c (with the exception of the cut-out portion 60). The lip 58 is sized to either limit or prevent the grain material from inadvertently falling from the paddle assembly 55 during operation. The lip 58 may increase the structural rigidity and integrity of the plate 56.

The cut-out portion 60 is defined at the central portion of the rear side 56a, and the cut-out portion 60 extends through the thickness of the plate 56. Cut-out portion 60 is sized to accommodate the body of the chain 34 and the flange 77.

Figure 10:
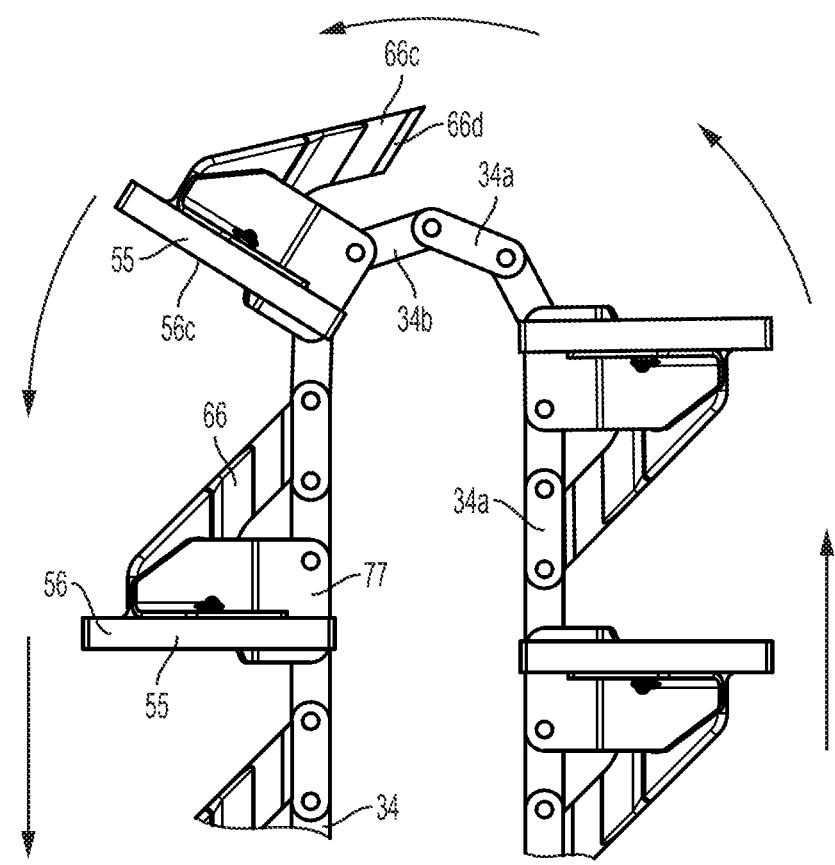
FIG. 10 depicts a side elevation view of the paddle assembly of FIGS. 3 and 4 attached to a chain.

The leg 66 has a wishbone shape (i.e., Y-shape) comprising two prongs 66a and 66b and one stem 66c. The prongs 66a and 66b bifurcate from the stem 66c. Each prong 66a and 66b is either integrated with or connected to the bottom side 56d of the plate 56 at a central region of the bottom side 56d. The stem 66c is disconnected from the chain 34, however, the stem 66c does releasably bear on the chain 34 during operation, as shown in FIG. 10 to support the weight of the grain on the paddle. The leg 66 extends from the bottom side 56d of the plate 56 in a downward direction away from the top side 56c of the plate 56. An acute angle 'A' (see FIG. 6) is defined between the leg 66 and the bottom side 56d of the plate 56. The acute angle A can vary between 10 degrees and 80 degrees, for example.

The leg 66 may be integrated with the plate 56 (as shown), or those components may be separate and connected by fasteners, for example. The plate 56 may be molded from a polymer such as rubber, plastic, or urethane. Molding permits complex geometrical features including features to help scoop grain, retain grain, or reduce paddle movement. The leg 66 and/or the plate 56 may be co-molded to have increased hardness on the areas subjected to increased wear, such as the leading edge 56e, and the contact surface 66d of the leg 66.

The flange 77 is fixedly mounted to links of the chain 34 by pins 68. The flange 77 may be considered as forming one link of the chain 34. The flange 77 is also mounted to the plate 56 by two rivets 79. The flange 77 includes a thin body having numerous bends for connecting to both the chain 34 and the plate 56. The flange 77 may be composed of a sheet metal material, such as stainless steel, for example.

More particularly, the flange 77 includes two vertically extending arms 80 each having two openings through which the pins 68 are connected to the chain 34. The vertical arms 80 are arranged flush to respective side surfaces of the chain 34. The flange 77 also includes two horizontally extending arms 82 having one opening each through which the rivet 79 is connected to the plate 56. The horizontal arms 82 sit flush on the bottom side 56d of the plate 56. As noted above the arms 80 and 82 are interconnected by bends formed in the sheetmetal. A central panel 84 is defined on each side of the flange 77 for connecting adjacent arms 80 and 82. Each central panel 84 is positioned to face a respective prong 66a/66b of the leg 66.

FIG. 10 depicts a series of paddle assembly 55 connected to a chain 34. The flange 77 of each paddle assembly 55 forms one link of the chain 34, as noted above. The contact surface 66d at the free end of the stem 66c is configured to bear on the link 34a, which is separated from the flange 77 by one or more intermediate links 34b. Stated differently, the plate 56 and the contact surface 66d of the leg 66 interact with different links of the chain 34. The contact surface 66d of the leg 66 has length and width dimensions that are substantially equivalent to length and width dimensions of one link of the chain 34.

As shown in FIG. 10, the paddle assembly 55 are configured to flip over as they move in the direction depicted by the arrows. As each paddle assembly 55 ascends up the grain elevator (as shown at the right in FIG. 10), the contact surface 66d at the free end of the stem 66c is configured to bear on the link 34a under the weight of the paddle assembly 55. After the paddle assembly 55 reaches the top of the grain elevator, the paddle assembly 55 dumps the grain as it flips over (as shown at the top left in FIG. 10). As the paddle assembly 55 flips over, the contact surface 66d of the stem 66c temporarily separates from the link 34c. As the paddle assembly 55 descends down the grain elevator (as shown at the left in FIG. 10), the contact surface 66d of the stem 66c regains contact with the link 34c.

Figure 11:
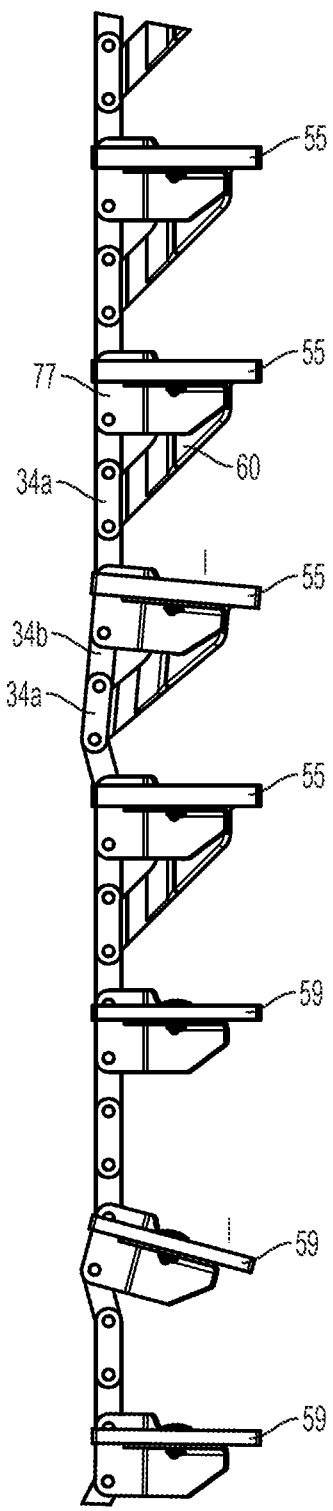
FIGS. 11 and 12 are side elevation and isometric views, respectively, of two different types of paddle assembly (i.e., paddle assembly according to the invention and conventional paddle assembly) attached to the same chain, and those figures depict how those paddle assembly tilt under a heavy load for comparison purposes.
Figure 12:
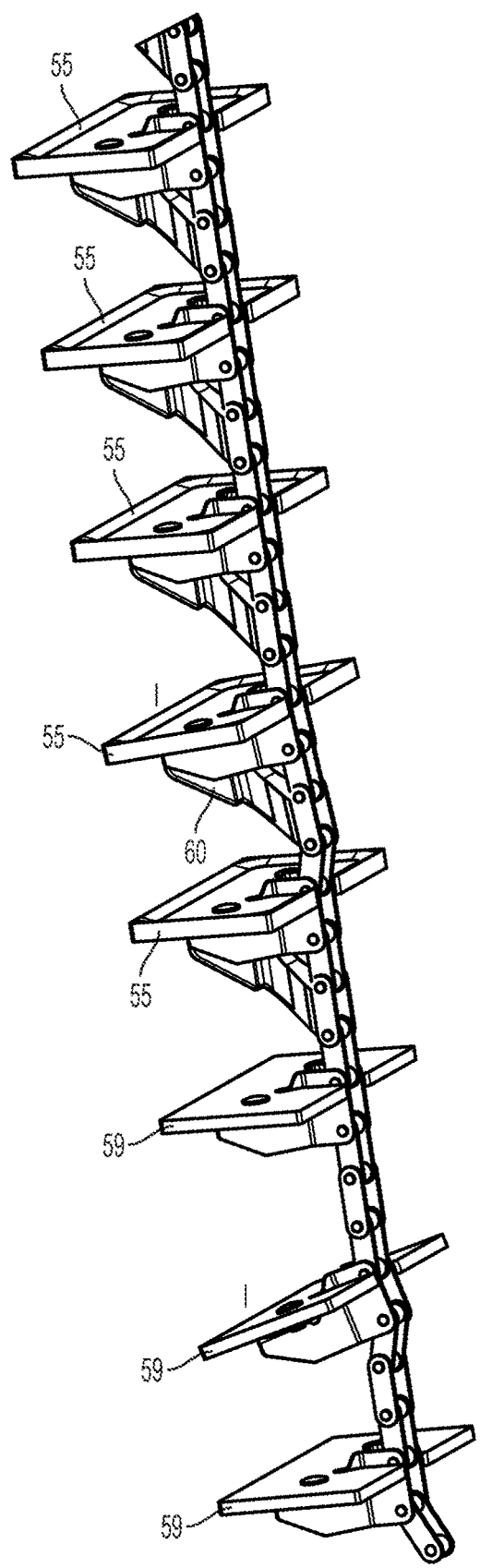

FIGS. 11 and 12 depict two different types of paddle assembly attached to the same chain 34, i.e., paddle assembly 55 according to the instant invention and conventional paddle assembly 59. Each conventional paddle assembly 59 forms (or is connected to) a single link of the chain 34. The conventional paddle assembly 59 has no other contact with chain 34. In contrast, the flange 77 of each paddle assembly 55 forms (or is connected to) one link of the chain 34; and, additionally, the leg 66 of each paddle assembly 55 bears on another link 34a of the chain 34. As noted above, link 34a is separated from flange 77 by link 34b.

FIGS. 11 and 12 depict the differences in how those paddle assembly 55 and 59 react to the same heavy load "L." As can be seen, the conventional paddle assembly 59 tilts by approximately 30 degrees under load L, whereas, the paddle assembly 55 tilts by approximately 10 degrees under load L. This reduction is attributed to the leg 66 of the paddle assembly 55, which provides an additional point of contact with the chain 34.

Tilting of a paddle assembly by more than 10 degrees, for example, could cause the grain on the paddle to inadvertently fall off of the paddle during operation. Additionally, as noted above, the lip 58 of the paddle assembly 55 is sized to either limit or prevent grain from inadvertently falling from the paddle assembly 55 during operation. Accordingly, during operation, far less grain will inadvertently fall off of the paddle assembly 55 during operation as compared with the conventional paddle assembly 59.

The leg 66 is particularly advantageous because it lengthens the moment arm of the paddle assembly 55 from one link to multiple links of the chain 34 and provides the chain 34 with greater resistance to rotation. This is particularly important as paddle assembly are designed to be longer, which will increase the deflection moment shown in FIGS. 11 and 12. The additional contact surface with the chain links provided by the leg 66 can also reduce fatigue and tension of the chain 34. Reduced tension and fatigue of the chain 34 will reduce wear of the chain 34, allow longer intervals between chain tensioning, and reduce the tendency of the chain 34 to disengage from a worn sprocket (item 36 in FIG. 2).

These and other advantages of the present invention will be apparent to those skilled in the art from the foregoing specification. Accordingly, it is to be recognized by those skilled in the art that changes or modifications may be made to the above-described embodiments without departing from the broad inventive concepts of the invention. It is to be understood that this invention is not limited to the particular embodiments described herein, but is intended to include all changes and modifications that are within the scope and spirit of the invention.

What is claimed is:

1. A paddle for a grain elevator of a combine harvester, the paddle comprising:
   a plate that is configured to be coupled to a chain at a first location on the chain, the plate having a top side for carrying grain and a bottom side opposite the top side; and
   a leg extending from the bottom side of the plate for releasably contacting the chain at a second location on the chain that is spaced from the first location,
   wherein the leg extends in a direction toward the chain and away from the top side of the plate, and
   wherein an acute angle is defined between the leg and the bottom side of the plate.

2. The paddle of claim 1, wherein the leg includes a stem portion that is bifurcated into two prongs, the stem portion having a contact surface for contacting the chain at the second location, and each prong being connected to the bottom side of the plate.

3. The paddle of claim 1, further comprising a flange for directly connecting the plate to the chain at the first location.

4. The paddle of claim 3, wherein the plate includes a cut-out portion for accommodating the flange.

5. The paddle of claim 1, wherein a contact surface of the leg that releasably contacts the chain has length and width dimensions that are substantially equivalent to length and width dimensions of one link of the chain.

6. The paddle of claim 1, wherein the first location and the second location on the chain are separated by at least one link of the chain.

7. The paddle of claim 1, further comprising a lip that extends along a perimeter of the top side of the plate for retaining the grain on the top side, wherein the lip extends above the top side of the plate.

8. The paddle of claim 1, wherein the plate is fixedly connected to the chain, and the leg is disconnected from the chain.

9. The paddle of claim 1, wherein the leg and the plate are unitized.

10. The paddle of claim 9, wherein the leg and the plate are formed from a molded polymer material.

11. The paddle of claim 1, wherein the leg is either connected to, or extends from, a central portion of the bottom side of the plate.

12. A paddle for a grain elevator of a combine harvester, the paddle comprising:
    a plate that is configured to be coupled to a chain at a first location on the chain, the plate having a top side for carrying grain and a bottom side opposite the top side; and
    a leg extending from the bottom side of the plate for releasably contacting the chain at a second location on the chain that is spaced from the first location,
    wherein a contact surface of the leg that releasably contacts the chain has length and width dimensions that are substantially equivalent to length and width dimensions of one link of the chain.

13. The paddle of claim 12, wherein the leg extends in a direction toward the chain and away from the top side of the plate.

14. The paddle of claim 13, wherein an acute angle is defined between the leg and the bottom side of the plate.

15. The paddle of claim 12, wherein the leg includes a stem portion that is bifurcated into two prongs, the stem portion having a contact surface for contacting the chain at the second location, and each prong being connected to the bottom side of the plate.

16. The paddle of claim 12, wherein the first location and the second location on the chain are separated by at least one link of the chain.

17. The paddle of claim 12, further comprising a lip that extends along a perimeter of the top side of the plate for retaining the grain on the top side, wherein the lip extends above the top side of the plate.

18. The paddle of claim 12, wherein the leg and the plate are unitized.

19. The paddle of claim 18, wherein the leg and the plate are formed from a molded polymer material.

20. The paddle of claim 12, wherein the leg is either connected to, or extends from, a central portion of the bottom side of the plate.

21. A paddle for a grain elevator of a combine harvester, the paddle comprising:
    a plate that is configured to be coupled to a chain at a first location on the chain, the plate having a top side for carrying grain and a bottom side opposite the top side; and
    a leg extending from the bottom side of the plate for releasably contacting the chain at a second location on the chain that is spaced from the first location,
    wherein the leg is either connected to, or extends from, a central portion of the bottom side of the plate.

22. The paddle of claim 21, wherein the leg extends in a direction toward the chain and away from the top side of the plate.

23. The paddle of claim 22, wherein an acute angle is defined between the leg and the bottom side of the plate.

24. The paddle of claim 21, wherein a contact surface of the leg that releasably contacts the chain has length and width dimensions that are substantially equivalent to length and width dimensions of one link of the chain.

25. The paddle of claim 21, wherein the first location and the second location on the chain are separated by at least one link of the chain.

26. The paddle of claim 21, wherein the leg and the plate are unitary and are formed from a molded polymer material.

* * * * *